May 2, 1944.            W. STORRIE            2,348,098
TORQUE MEASURING TOOL
Filed Nov. 10, 1943
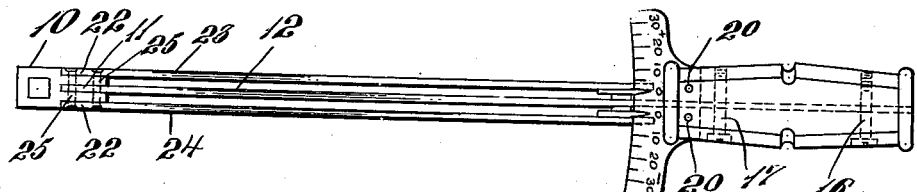
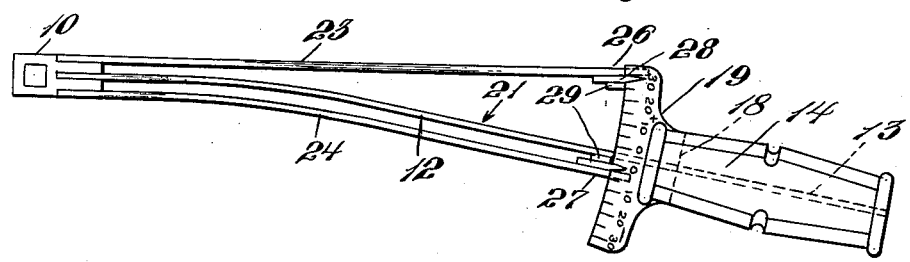
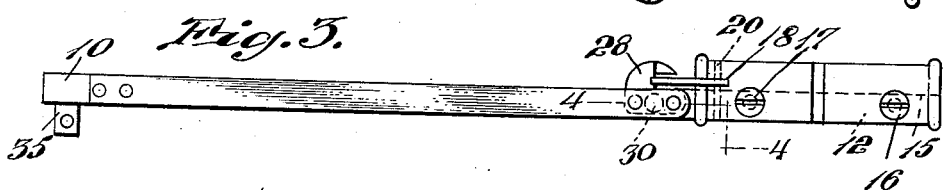
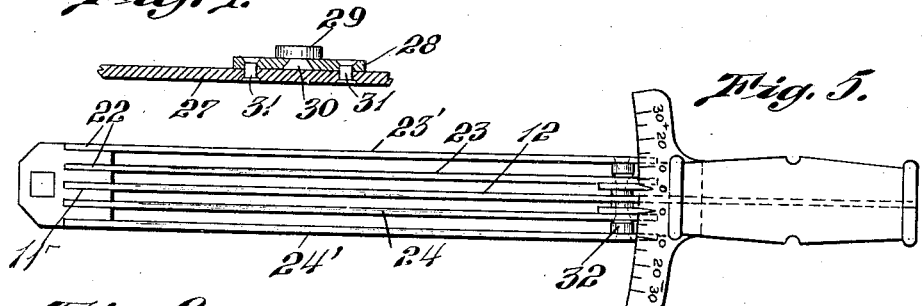
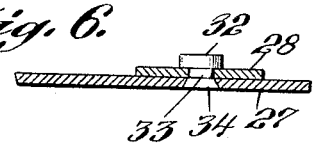
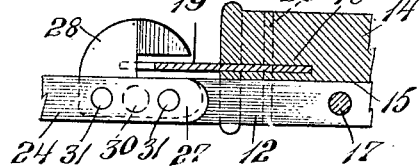
INVENTOR
William Storrie
BY Barlow & Barlow
ATTORNEYS Patented May 2, 1944

2,348,098

UNITED STATES PATENT OFFICE 2,348,098

TORQUE MEASURING TOOL

William Storrie, Rumford, R. I., assignor to Apco Mossberg Company, a corporation of Massachusetts Application November 10, 1943, Serial No. 509,711

5 Claims. (Cl. 265—1)

This invention relates to a torque measuring tool and has special reference to a device for applying a turning force to a nut or a bolt in a manner such that this force may be measured.

In the building of modern machinery or rebuilding and tuning up high grade or precision mechanical structures accurate and uniform tightening of studs and bolts is required. A mechanical indication is found to be more certain than the skill, dependent upon feel, of the best mechanics, in order that even tension may be had throughout the work operated upon.

One of the objects of this invention is to provide a flexible beam which may be strengthened by the addition of flexible bars positioned along either side thereof.

Another object of the invention is to utilize one of the flexible bars which cooperate with the beam to serve as an indicating means to show the force applied.

Another object of the invention is to provide an arrangement which will have a sufficient length of leverage so that a substantial extent of movement may be provided for accuracy of indication.

Another object of the invention is to provide an arrangement in which the flexing strength of the beam may be readily supplemented by the addition of a plurality of flexible bars on either side thereof.

Another object of the invention is to provide a wrench which may operate both on right hand or left hand bolts or nuts with equal facility.

With these and other objects in view, the invention consists of certain novel features of construction, as will be more fully described and particularly pointed out in the appended claims.

In the accompanying drawing:

Fig. 1 is a top plan view of the tool with the beam unstressed;

Fig. 2 is a view similar to Fig. 1 but illustrating the beam as stressed in a clockwise direction;

Fig. 3 is a side elevation of the tool;

Fig. 4 is a section on substantially line 4—4 of Fig. 3;

Fig. 5 is a top plan view of a tool similar to Fig. 1 but modified to the extent of utilizing additional side bars;

Fig. 6 illustrates in section a modified form of structure shown in Fig. 4;

Fig. 7 is a fragmental section showing the relation of the scale and pointer.

In proceeding with this invention I provide a head to engage the work, to which head there is fixedly attached a beam which may be flexed. On the end of this beam a handle is provided through which flexing pressure may be applied to the head. A scale is carried by the handle and bars are provided at either side of the beam which are also flexible, the bar on one side of the beam being picked up and assisting in restricting movement of the beam while the bar on the other side serves as a pointer to move over the scale carried by the handle, in order to determine the turning force which is being applied to the head through the beam.

With reference to the drawing, 10 designates a head which is slotted as at 11 for the reception of a beam 12 having a free or movable end portion 13 upon which a handle 14 is provided. This handle may be of a molded plastic form slotted as at 15 to receive the beam 12 therein, the beam being held in position by bolts 16 and 17 as shown in Fig. 1. A slot 18 may also be formed in the handle into which a scale 19 may be positioned and held by two pins 20. This scale is positioned above the beam but will move with the beam as it is flexed along the arc of a parabola as indicated at 21 in Fig. 2.

Slots 22 are provided on either side of the head 10 in spaced relation to the slot 11 for the reception of bars 23 and 24 which are also of a flexible nature and which are held to the head together with the beam 12 by means of rivets 25 which extend through the bars, beam and head to hold these parts in assembled relation, as shown in Fig. 1.

The free ends 26 and 27 of each of these bars 23 and 24 are equipped with a pointer 28 which is attached to the bar on the side of the bar nearest to the beam. This pointer 28 has assembled on it a contact member 29 by means of riveting of a reduced portion of this contact as at 30 and riveting it to the pointer 28 while the pointer is assembled on the bar by means of rivets 31 such as shown in Fig. 4. In some instances the pointer 28 may be riveted directly to the bar 27 by a contact member 32 reduced as at 33 and extending through the bar 27 and enlarged as at 34. This portion 33 and the opening through which it passes may be squared to prevent rotation of the pointer 28 on the bar. The member 29 or 32 is of a sufficient extent to fill the space between the bars and to contact or substantially contact with the beam 12 when in unstressed condition.

By this arrangement when pressure is applied to the handle 14 in a clockwise direction as shown in Fig. 2 the beam 12 will be flexed along the arc of a parabola as shown in Fig. 2, the contact 29 will be engaged and move the bar 24 with the beam while the bar 23 will remain unmoved and its pointer 28 will indicate on the moved scale 19 the pressure that is being applied through the beam to the work which is engaged by the head.

A suitable squared work-engaging means 35 on the head is indicated as one means for engaging work. If the movement of the handle 14 is in a clockwise direction a suitable tension is applied for tightening a right-handed bolt or nut. If, however, it is desired to tighten a left-handed bolt or nut, handle 14 would then be moved in a counterclockwise direction with reference to the head, the bar 23 would be moved through engagement with the contact 29 and carried by the end 26 thereof and the bar 24 and its end 27 would remain stationary with the scale carried by the handle movable under this pointer to show the amount of pressure that was being applied on the work through the head. Where right-handed pressure is applied a plus indication is shown on the scale 19 while when left-handed pressure is applied this is indicated as minus on the scale. Any suitable datum lines may of course be provided for the indication desired in inch pounds, inch ounces, or any other measurement.

In cases where it is desired to additionally supplement the resistance provided for the beam 12 more than one bar will be used and I have indicated in Fig. 5 additional bars 23' on one side and 24' on the other, each equipped with its contact element 32 to in this case engage the next adjacent bar 23 or 24 inwardly thereof and to be moved by this bar as the beam flexes in one direction or the other. Any suitable multiple of bars may be provided that the desired resistance may be had to turning movement. Where a number of bars are provided, one of these will serve as a pointer, usually the innermost one and the other bars instead of carrying a pointer will carry the contact element such as 32 to fill the space between the bars but yet permit sliding movement of the bars with reference to each other and with reference to the beam as flexing occurs.

Various magnitudes of resistance to turning may also be provided by the use of different size beams which may be obtained with sufficiently uniform flexibility so that scales may be stamped out in multiple production.

I claim:

1. A torque measuring tool comprising a head having a formation for engaging work, a deflectable beam having one end fixed to said head and extending therefrom, a handle including a gripping portion in fixed relation to the other end of said beam, a flexible bar on each side of said beam each having one end fixed to said head and extending therefrom parallel to the unstressed position of said beam, the other end of said bars being adjacent to but free of and movable with relation to said handle, a scale on said handle and an indicator carried by the free end of each bar and extending over said scale whereby movement of the scale and beam in either direction will engage one bar and cause movement thereof with the beam while leaving the other bar to indicate on the scale the relative movement which occurs.

2. A torque measuring tool comprising a head having a formation for engaging work, a deflectable beam having one end fixed to said head and extending therefrom, a handle including a gripping portion in fixed relation to the other end of said beam, a scale movable with said handle, a flexible bar on each side of said beam each having one end fixed to said head and extending therefrom parallel to the unstressed position of said beam, the other end of said bars being adjacent to but free of and movable with relation to said scale and each provided with an indicator extending over said scale whereby movement of the handle and beam in either direction will engage one bar and cause movement thereof with the beam while leaving the other bar to indicate on the scale the relative movement which occurs.

3. A torque measuring tool comprising a head having a formation for engaging work, a deflectable beam having one end fixed to said head and extending therefrom, a handle including a gripping portion in fixed relation to the other end of said beam, a plurality of flexible bars on each side of said beam each having one end fixed to said head and extending therefrom parallel to the unstressed position of said beam, the other end of each of said bars being adjacent to but free of and movable with relation to said handle, a scale on said handle and an indicator carried by the free end of each bar and extending over said scale whereby movement of the beam in either direction will engage one bar and cause movement of the several bars on one side of the beam with the beam, while leaving the other bars to indicate on the scale the relative movement which occurs.

4. A torque measuring tool comprising a head having a formation for engaging work, a deflectable beam having one end fixed to said head and extending therefrom, a handle including a gripping portion in fixed relation to the other end of said beam, a scale movable with said handle, a plurality of flexible bars on each side of said beam each having one end fixed to said head and extending therefrom parallel to the unstressed position of said beam, the other end of each of said bars being adjacent to but free of and movable with relation to said scale and one bar on each side of the beam being provided with an indicator extending over said scale whereby movement of the handle and beam in either direction will engage one bar and cause movement of the several bars on one side of the beam with the beam, while leaving the other bars to indicate on the scale the relative movement which occurs.

5. A torque measuring tool comprising a head having a formation for engaging work, a deflectable beam having one end fixed to said head and extending therefrom, a handle including a gripping portion in fixed relation to the other end of said beam, a scale movable with said handle, a flexible bar on each side of said beam, each bar having one end fixed to said head in spaced relation to the beam and extending therefrom parallel to the unstressed position of said beam, the other end of each of said bars being adjacent to but free of and movable with relation to said scale, a contact member on each bar at the free end of the bar extending toward the beam across the space between the beam and bar, an indicator carried by each bar extending over said scale whereby movement of the scale and beam in either direction will engage one bar through the contact member and cause movement thereof with the beam, while leaving the other bar to indicate on the scale the relative movement which occurs.

WILLIAM STORRIE.